(12) United States Patent
Konno et al.

(10) Patent No.: US 6,868,052 B2
(45) Date of Patent: Mar. 15, 2005

(54) OPTICAL DISC PLAYBACK APPARATUS AND METHOD OF JUDGING DISC TYPE

(75) Inventors: Mitunori Konno, Kyoto (JP); Masato Nagasawa, Kyoto (JP); Mituru Umazaki, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 635 days.

(21) Appl. No.: 09/849,493

(22) Filed: May 7, 2001

(65) Prior Publication Data

US 2002/0041551 A1 Apr. 11, 2002

(30) Foreign Application Priority Data

Oct. 5, 2000 (JP) .................................. P2000-306467

(51) Int. Cl.[7] .............................................. G11B 7/00
(52) U.S. Cl. .......................... 369/53.23; 369/53.28; 369/44.41; 369/53.11; 369/53.22; 369/59.1
(58) Field of Search ......................... 369/53.22, 53.23, 369/59.1–59.27, 44.25–47.52, 53.28, 44.41

(56) References Cited

U.S. PATENT DOCUMENTS

| | | | | |
|---|---|---|---|---|
| 4,785,441 A | * | 11/1988 | Tanaka et al. ............ | 369/44.41 |
| 5,721,718 A | * | 2/1998 | Hwang .................... | 369/53.23 |
| 5,724,325 A | * | 3/1998 | Jeong ...................... | 369/53.23 |
| 5,745,460 A | * | 4/1998 | Tateishi ................... | 369/53.22 |
| 5,774,438 A | * | 6/1998 | Park et al. ............... | 369/53.23 |
| 5,808,979 A | * | 9/1998 | Ishibashi et al. ......... | 369/59.23 |
| 5,831,953 A | * | 11/1998 | Numata .................... | 369/53.23 |
| 5,903,531 A | * | 5/1999 | Satoh et al. ............. | 369/53.23 |
| 5,966,355 A | | 10/1999 | Kamiyama | |
| 5,978,337 A | | 11/1999 | Takeya et al. | |
| 6,021,109 A | * | 2/2000 | Spruit et al. ............ | 369/100 |
| 6,137,758 A | * | 10/2000 | Nemoto ................... | 369/53.23 |
| 6,262,957 B1 | * | 7/2001 | Inoue et al. ............. | 369/53.23 |
| 6,288,988 B1 | * | 9/2001 | Kumagai .................. | 369/53.23 |
| 6,317,396 B1 | * | 11/2001 | Kuribayashi ............. | 369/53.31 |
| 6,411,577 B1 | * | 6/2002 | Hirose .................... | 369/53.22 |
| 6,449,232 B1 | * | 9/2002 | Kuwahara et al. ....... | 369/53.23 |
| 6,741,533 B1 | * | 5/2004 | Hiratsuka et al. ........ | 369/44.41 |
| 6,747,931 B1 | * | 6/2004 | Park ....................... | 369/53.23 |

FOREIGN PATENT DOCUMENTS

| | | | |
|---|---|---|---|
| EP | 0767456 A1 | 4/1997 | |
| EP | 0790604 A2 | 8/1997 | |
| JP | 07296498 A | * 11/1995 | ........... G11B/19/12 |
| JP | 10162381 A | * 6/1998 | ............ G11B/7/09 |
| JP | 10302381 | 11/1998 | |
| JP | 10334574 | 12/1998 | |
| JP | 2896110 | 3/1999 | |
| WO | WO 99/40583 A1 | 8/1999 | |

* cited by examiner

*Primary Examiner*—Doris H. To
*Assistant Examiner*—Jorge L. Ortiz-Criado
(74) *Attorney, Agent, or Firm*—Birch, Stewart, Kolasch & Birch LLP

(57) ABSTRACT

In a system using a pickup including a bifocal lens which is one lens having two focal points, mere judgment by the number of peaks of a focus error signal does not achieve a clear judgment of the type of an optical disc, especially whether it is a CD or a DVD. Therefore, it is required to perform a judgment based on a difference in recording density of the optical disc. According to the present invention, when detecting a tracking error by the phase difference method, a pulse width limit circuit 35 in a tracking error detecting circuit 7 provides such limitations that a pulse of a width larger than a predetermined pulse width should not appear in a pulse train of a phase error signal. Disc type judgment is then performed for discs having different recording densities, for instance, whether it is a CD or a DVD, based on the phase error signal after the pulse width limitation or that before and after the pulse width limitation.

21 Claims, 16 Drawing Sheets

F I G. 1
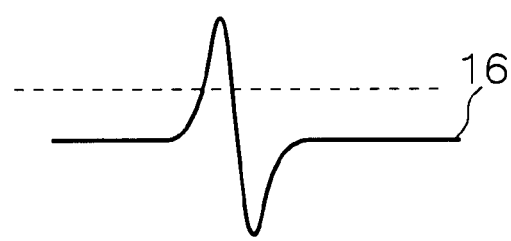
CD DISC
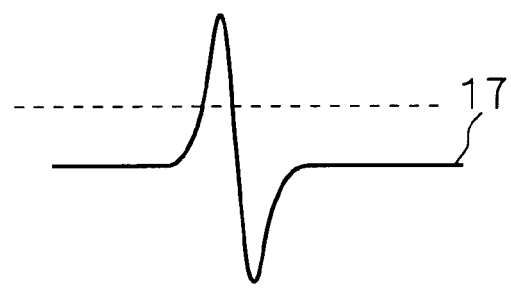
DVD-SL DISC
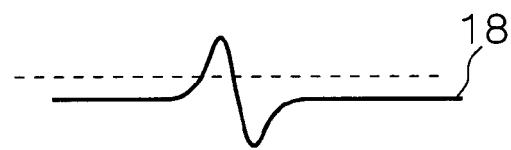
DVD-RW DISC
DVD-DL DISC F I G. 2
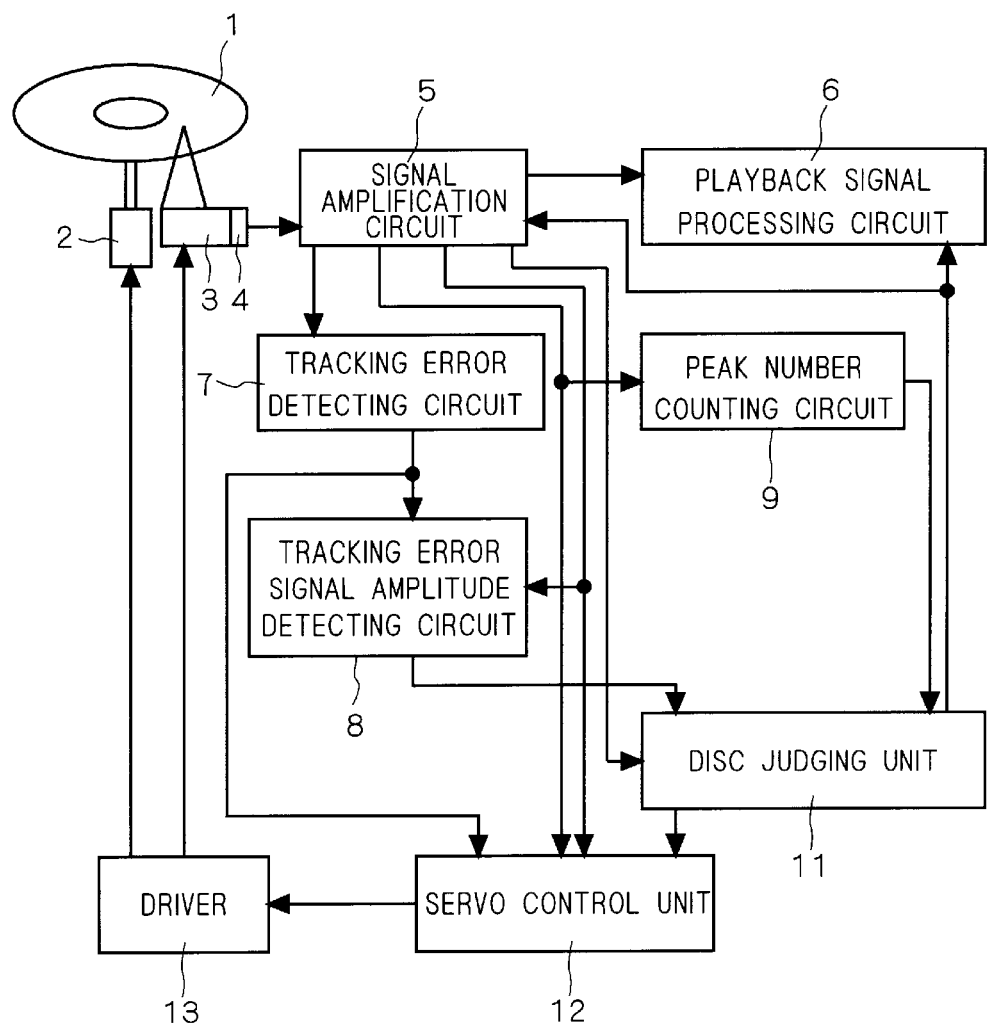

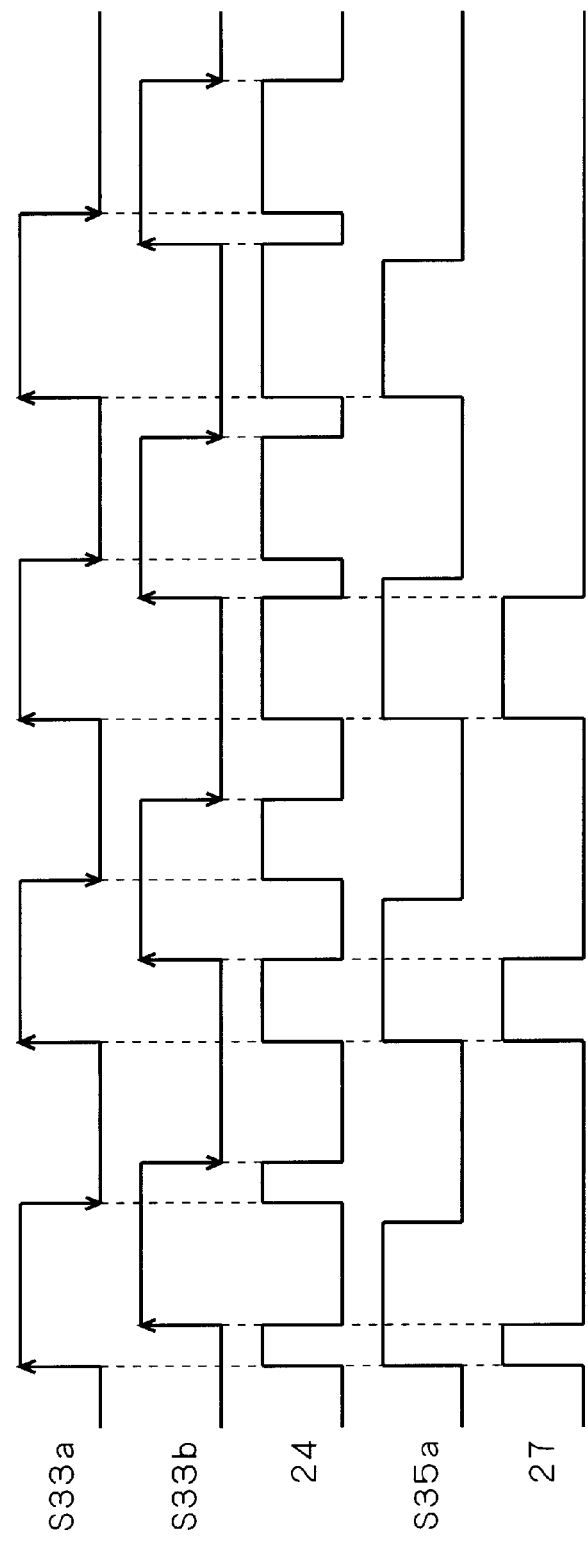

F / G. 8
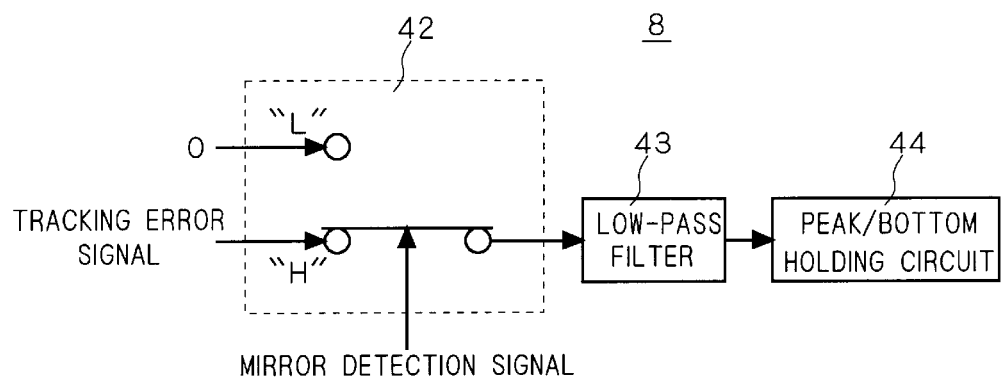
F / G. 9
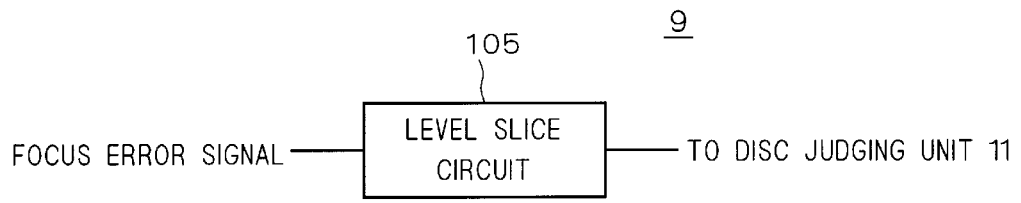

FIG. 16
BACKGROUND ART
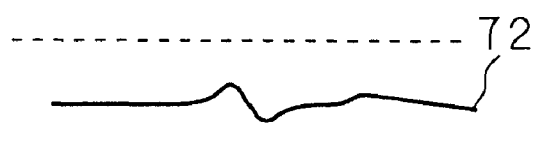
CD DISC
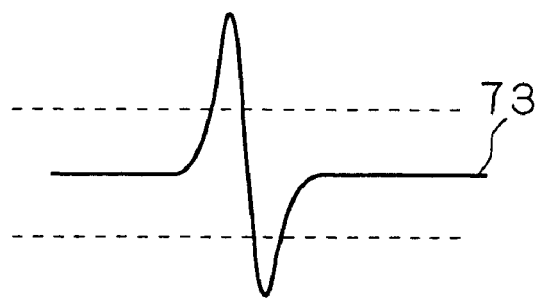
DVD-SL DISC
DVD-DL DISC

OPTICAL DISC PLAYBACK APPARATUS AND METHOD OF JUDGING DISC TYPE

BACKGROUND OF THE INVENTION

1. Field of the Invention

The present invention relates to an optical disc playback apparatus capable of judging disc type and a method of judging disc type in the optical disc playback apparatus.

2. Description of the Background Art

FIG. 16 shows focus error signal waveforms in a conventional optical disc playback apparatus. There are shown focus error signals when searching is performed for optical discs of different types by means of an optical pickup using a lens having a numerical aperture (NA) of 0.6, which is generally used for DVD playback. Specifically, a waveform 72 corresponds to a focus error signal when a CD is used, a waveform 73 corresponds to a focus error signal when a single-layer DVD (DVD-SL) is used, and a waveform 74 corresponds to a focus error signal when a double-layer DVD (DVD-DL) is used.

As is apparent from FIG. 16, the focus error signal 73 in the single-layer DVD has a large amplitude, characterized by having its peak (maximum voltage level) and bottom (minimum voltage level) each outputted once in the waveform. The focus error signal 74 in the double-layer DVD is characterized by having its peak and bottom each outputted twice in the waveform. The focus error signal 72 in the CD has an extremely small amplitude when the lens for a DVD having a numerical aperture of 0.6 is used, rendering the peak and bottom of the waveform indefinite.

FIG. 17 shows a structure of a twin lens optical pickup comprising two lenses having different numerical apertures. The twin lens pickup shown in the drawing comprises an objective lens 75 for a CD in general use (NA=0.45), an objective lens 76 for a DVD in general use (NA=0.6), a central shaft 77 of an actuator, an actuator base 78, a tracking coil 79, a focusing coil 80, a mirror 81, a laser diode 82, a half mirror 83 and a photodetector 84.

Laser outputted from the laser diode 82 is conveyed to the mirror 81 by the half mirror 83 and radiated onto an optical disc (not shown) through the objective lens 76 for a DVD. The laser reflected from the optical disc passes through the mirror 81 and the half mirror 83, and inputted into the photodetector 84.

Since a DVD and a CD are different in pit size of a recording signal and thickness from a surface of the optical disc to a recording layer, a focusing position and a spot diameter of laser light needs to be varied depending on the type of the optical disc in order for compatible playback between a DVD and a CD. Thus, an axial sliding and rotating method is employed in the twin lens optical pickup shown in FIG. 17, thereby switching the objective lens 75 for a CD and the objective lens 76 for a DVD. In this axial sliding and rotating method, the actuator base 78 is moved up and down along the central shaft 77 by driving the focusing coil 80 and is rotated about the central shaft 77 by driving the tracking coil 79.

FIG. 18 shows a structure of a disc judging circuit in the conventional optical disc playback apparatus. The optical disc playback apparatus shown in the drawing comprises a peak number counting circuit 90 and a judging circuit 91. The result of disc judgment is provided for a lens kick circuit 92, a servo parameter changing circuit 93 and a servo gain-up switching circuit 94. The lens kick circuit 92 has its output given to a driver 95 for driving the tracking coil 79.

Next, explanation will be given on the operation of the disc judging circuit shown in FIG. 18. A focus error signal obtained from the optical pickup is inputted into the peak number counting circuit 90. The peak number counting circuit 90 counts the number that peak and bottom appear in the focus error signal. When the inputted focus error signal has waveform with its peak and bottom each appearing once, the peak number is counted as one. The counted number is transmitted to the judging circuit 91. The judging circuit 91 detects the characteristics of focus error signals in various types of discs as shown in FIG. 16 based on an output signal indicative of the peak number outputted from the peak number counting circuit 90, thereby judging the disc type, whether a CD, a single-layer DVD or a double-layer DVD.

A signal indicative of the judgment result is transmitted to the lens kick circuit 92, the servo parameter changing circuit and the servo gain-up switching circuit 94. The lens kick circuit 92 drives the tracking actuator (tracking coil) 79 through the tracking actuator driver 95 to make a switch between the objective lens 75 for CDs and the objective lens 76 for DVDs. The servo parameter changing circuit 93 changes a servo parameter to one that is optimum for each disc.

Generally, in performing focus servo control, a servo gain is automatically adjusted during a constant operation, which allows a servo system to operate extremely stably. However, before the constant operation is started, for example, just after a focus is drawn in, the servo gain is not automatically adjusted. When there is a difference in a focus gain depending on a difference in reflectance of a disc, a servo may not be drawn in. Therefore, the servo gain-up switching circuit 94 sets an optimum servo gain-up for each disc based upon the result of the disc type judgment.

FIG. 19 shows waveforms indicating a measuring procedure at disc judgment and focus-on operation performed on the double-layer DVD. There is shown a voltage waveform of the focus actuator (focusing coil) 80 and a waveform of a focus error signal which are obtained at disc judgment. The reference character 96 indicates a focus actuator voltage waveform, and the reference character 97 indicates a focus error signal waveform, in a series of operations from disc judgment to focus-on. As can be seen from the drawing, the focus actuator is first moved up and down to count the number of focus error signals FS, thereby performing the disc judgment. Thereafter, the optical head is moved into an inner periphery, and the focus actuator is again moved up and down, so that the focus is drawn in.

FIG. 20 shows where and how an optical head is positioned at disc judgment and focus-on operation performed as shown in FIG. 19. The reference characters 98, 99, 100 and 101 indicate an optical disc, a spindle motor, an inner switch and an optical head, respectively. First, the optical head is positioned in an outer peripheral direction to perform the disc judgment. After the disc judgment is finished, the optical head is moved into an inner periphery so that the focus is drawn in.

The above described conventional disc judging method is based on the principle shown in FIG. 16 using the objective lens for a DVD, which is applicable only to a system using two objective lenses, one for a DVD and the other for a CD. A judging method different from the conventional one is required in a system using a pickup with a bifocal lens which is one lens having two focal points. After the focus is drawn in, it is necessary to make a switch of a tracking method (between the triple beam method and the DPD (phase difference) method) and to change the settings of the servo gain. Thus, judgment should be carried out in a step prior to tracking.

In the conventional method, there has been a possibility of making a misjudgment with variations in temperature in an apparatus, fluctuations in laser power due to adjustment variations in early stages of volume production and variations in disc reflectance. In addition, fingerprints and scratches on a disc and the like cause variations in equivalent reflectance, which also result in factors causing a misjudgment.

Further, when the laser power and the reflectance are increased, an unnecessary focus error signal to a surface of a disc substrate, not to an information surface, may also result in a misjudgment. Furthermore, when peak and bottom values are misdetected by signal noise, a misjudgment similarly occurs.

SUMMARY OF THE INVENTION

A first aspect of the present invention is directed to an optical disc playback apparatus comprising: an optical head for reading information recorded on an optical disc, comprising a photodetector divided into plural parts receiving reflected light from the optical disc; signal generating means for binarizing an output signal of the photodetector to detect phase difference, thereby generating a pulse train signal having a variable pulse width in accordance with a tracking error as well as recording density of the optical disc; and judging means for performing disc type judgment of the optical disc based on the pulse train signal.

A second aspect of the present invention is directed to the optical disc playback apparatus, wherein the optical head comprises a bifocal lens.

A third aspect of the present invention is directed to the optical disc playback apparatus, further comprising a pulse width limit circuit for preventing occurrence of a pulse having a width larger than a predetermined width in the pulse train signal, wherein the judging means performs the disc type judgment based on the pulse train signal after pulse width limitation.

A fourth aspect of the present invention is directed to the optical disc playback apparatus, wherein the pulse width limit circuit is capable of selectively setting a first predetermined width or a second predetermined width as the predetermined width, and the judging means performs the disc type judgment based on the pulse train signal after pulse width limitation with the first predetermined width and the pulse train signal after pulse width limitation with the second predetermined width.

A fifth aspect of the present invention is directed to the optical disc playback apparatus of the first aspect, further comprising a pulse width limit circuit for preventing occurrence of a pulse having a width larger than a predetermined width in the pulse train signal, wherein the judging means performs the disc type judgment based on the pulse train signal before pulse width limitation and the pulse train signal after pulse width limitation.

A sixth aspect of the present invention is directed to the optical disc playback apparatus, further comprising: means for generating a mirror detection signal from an output signal of the optical head; and means for making the pulse train signal effective for the disc type judgment by the judging means only for a period of time responsive to the mirror detection signal.

A seventh aspect of the present invention is directed to the optical disc playback apparatus, further comprising means for generating a focus error signal from an output signal of the optical head, wherein the judging means performs the disc type judgment based on the focus error signal as well as the pulse train signal.

An eighth aspect of the present invention is directed to the optical disc playback apparatus, further comprising means for generating a playback signal from an output signal of the optical head and detecting the amplitude thereof, wherein the judging means performs the disc type judgment based on the detected amplitude as well as the pulse train signal.

A ninth aspect of the present invention is directed to a method of judging disc type in an optical disc playback apparatus. The method comprises the steps of: reading information recorded on an optical disc using an optical head comprising a photodetector divided into plural parts receiving reflected light from the optical disc; binarizing an output signal of the photodetector to detect phase difference, thereby generating a pulse train signal having a variable pulse width in accordance with a tracking error and a recording density of the optical disc; and judging disc type of the optical disc based on the pulse train signal.

A tenth aspect of the present invention is directed to the method of judging disc type in an optical disc playback apparatus, wherein the optical head comprises a bifocal lens.

An eleventh aspect of the present invention is directed to the method of judging disc type in an optical disc playback apparatus, further comprising the step of preventing occurrence of a pulse having a width larger than a predetermined width in the pulse train signal, wherein the disc type judgment is performed based on the pulse train signal after pulse width limitation.

A twelfth aspect of the present invention is directed to the method of judging disc type in an optical disc playback apparatus, wherein a first predetermined width or a second predetermined width can selectively be set as the predetermined width, and the disc type judgment is performed based on the pulse train signal after pulse width limitation with the first predetermined width and the pulse train signal after pulse width limitation with the second predetermined width.

A thirteenth aspect of the present invention is directed to the method of judging disc type in an optical disc playback apparatus, further comprising the step of preventing occurrence of a pulse having a width larger than a predetermined width in the pulse train signal, wherein the disc type judgment is performed by means of comparison or ratio between information obtained from the pulse train signal before pulse width limitation and that obtained from the pulse train signal after pulse width limitation.

A fourteenth aspect of the present invention is directed to the method of judging disc type in an optical disc playback apparatus, further comprising the steps of: generating a mirror detection signal from an output signal of the optical head; and making the pulse train signal effective for the disc type judgment in the step of judging only for a period of time responsive to the mirror detection signal.

A fifteenth aspect of the present invention is directed to the method of judging disc type in an optical disc playback apparatus, further comprising the step of generating a focus error signal from an output signal of the optical head, wherein the disc type judgment is performed based on the focus error signal as well as the pulse train signal.

A sixteenth aspect of the present invention is directed to the method of judging disc type in an optical disc playback apparatus, further comprising the step of generating a playback signal from an output signal of the optical head and detecting the amplitude thereof, wherein the disc type judgment is performed based on the detected amplitude as well as the pulse train signal.

According to the first and ninth aspects of the present invention, disc type judgment can be performed for discs having different recording densities. As another effect, it is possible to utilize the structure of the phase difference method which is essentially necessary for detecting the tracking error. The use of a binarized signal as a differential phase error signal causes no influence on the above binarized information even if there are variations in the amplitude of the playback signal from the optical head. Therefore, there is no influence due to a difference in disc reflectance and variations in laser power, and a misjudgment does not occur.

According to the second and tenth aspects of the present invention, using a bifocal lens to reduce the number of parts, disc type judgment can be performed for discs having different recording densities.

According to the third and eleventh aspects of the present invention, it is possible to utilize the pulse width limit circuit which is essentially provided for preventing occurrence of an abnormal voltage due to noise or the like.

According to the fourth, fifth, twelfth and thirteenth aspects of the present invention, two signals different in settings on pulse width limit values are used for judgment, so that various variations can be compensated by, e.g., taking the ratio between the two signals. For instance, even when there are variations in pit depth of the disc, which affects the phase error signal, judgment by the ratio enables to compensate the influence due to the variations in pit depth. As a result, this prevents a misjudgment. Further, there is no influence caused as above described by variations in the number of rotations of the disc and variations in the linear density.

According to the sixth and fourteenth aspects of the present invention, a difference in the recording density of the optical disc can be reflected greatly, which enables to prevent a misjudgment.

According to the seventh, eighth, fifteenth and sixteenth aspects of the present invention, various types of optical discs can be distinguished.

It is an object of the present invention to provide an optical disc playback apparatus and a disc type judging method capable of distinguishing a CD and a DVD by a method without using the peak number in order to effectively perform disc type judgment in a method using a pickup with a bifocal lens which is one lens having two focal points.

It is another object of the present invention to obtain an optical disc playback apparatus and a disc type judging method which are hardly sensitive to fluctuations in laser power, variations in disc reflectance, fluctuations in the degree of modulation of a playback signal and the like, so that misjudgment hardly occurs in the disc type judgment.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows waveforms indicating focus error signals when a bifocal lens is used;

FIG. 2 is a block diagram showing an optical disc playback apparatus according to a preferred embodiment of the present invention;

FIG. 7 is a timing chart showing the operation of a limit pulse generation circuit 35a shown in FIG. 6;

FIG. 8 is a detail block diagram showing a tracking error signal amplitude detecting circuit 8 shown in FIG. 2;

FIG. 9 is a detail block diagram showing a peak number counting circuit 9 shown in FIG. 2;

FIG. 16 shows waveforms of focus error signals in a conventional optical disc playback apparatus;

DESCRIPTION OF THE PREFERRED EMBODIMENTS

Figure 3:
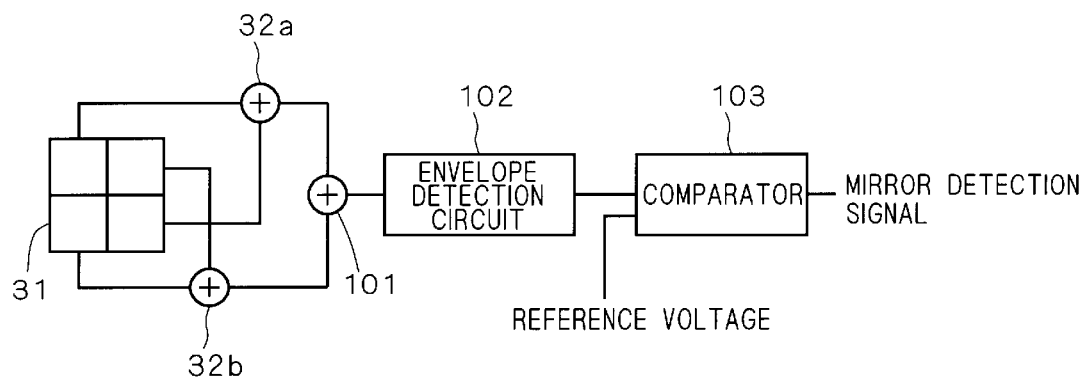
FIGS. 3 and 4 are detail block diagrams showing signal generation at a signal amplification circuit 5 shown in FIG. 2.

FIG. 1 shows waveforms indicating focus error signals when a bifocal lens is used which is one lens having two focal points, one for a CD and the other for a DVD. As shown, waveform 16 indicates a focus error signal waveform when searching is performed with a bifocal lens in an optical disc playback apparatus with a CD disc mounted thereon. Waveform 17 indicates a focus error signal waveform when searching is performed with a bifocal lens in an optical disc playback apparatus with a DVD single-layer (DVD-SL) disc mounted thereon. Waveform 18 indicates a focus error signal waveform when searching is performed with a bifocal lens in an optical disc playback apparatus with a recordable DVD (DVD-RW) disc mounted thereon. Waveform 19 indicates a focus error signal waveform when searching is performed with a bifocal lens in an optical disc playback apparatus with a DVD double-layer (DVD-DL) disc mounted thereon.

In an optical pickup having a conventional lens intended for exclusive use in a DVD (with high NA), focus error signals appear in such waveforms as those shown in FIG. 16 at focus search. That is, when a CD disc having a thick substrate is searched with a lens with high NA, focusing is not obtained. Thus, there appears no S-curve indicating an adjusted focal point, whereas, in the case of a DVD disc having a thin substrate, S-curve appears once in a single-layer disc and twice in a double-layer disc. Counting the number that S-curve appears when it exceeds a signal at a certain reference level (shown by dotted lines in FIG. 16)

allows disc type judgment depending on whether the S-curve never appears, or appears once or twice.

On the other hand, when searching is performed with an optical head having an optical pickup with a bifocal lens mounted thereon which has two focal points for a CD and for a DVD in order to reduce the cost and the number of parts, one S-curve appears once in either cases of a CD disc, a DVD single-layer disc and a recordable DVD disc, as indicated by the focus error signal waveforms 16, 17 and 18 shown in FIG. 1, respectively. In the case of a DVD double-layer disc, S-curve appears twice as indicated by the focus error signal waveform 19. Therefore, in this case, it is not possible to judge the disc type clearly only based on the number that S-curve appears. Thus, in the case of an optical pickup using a bifocal lens, judging procedure should be further added for distinguishing a CD disc and a DVD disc.

FIG. 2 is a block diagram showing the optical disc playback apparatus of the present invention in which judging procedure is further added for distinguishing a CD disc and a DVD disc so as to be adaptable also to the optical pickup having the above-described bifocal lens mounted thereon. The present invention will be specifically described below referring to drawings showing the preferred embodiment.

FIG. 2 is a block diagram showing the optical disc playback apparatus according to the present embodiment. In the drawing, a playback-only or recordable optical disc 1 is rotated by a spindle motor 2. Information recorded on the disc 1 is played back by an optical head 3 having an actuator mounted thereon for reading optical information and aligning an optical spot. The optical head 3 has an optical pickup with a bifocal lens having two focal points for a CD and for a DVD, and a photodetector 4 for reading information and a control signal from light reflected by the optical disc 1. A minute signal from the photodetector 4 is amplified at a signal amplification circuit 5 and is generated as a playback signal and another signal necessary for controlling a servo and the like. The playback signal is processed at a playback signal processing circuit 6, thereby obtaining desired information.

A tracking error detecting circuit 7 is provided to obtain a tracking error signal from an output of the signal amplification circuit 5 with the phase difference method. A tracking error signal amplitude detecting circuit 8 is also provided to measure the amplitude of the tracking error signal which is an output of the tracking error detecting circuit 7. Further, a peak number counting circuit 9 is provided to count the number of peaks in a focus error signal which is an output of the signal amplification circuit 5 at focus search.

The disc judgment according to the present invention is carried out at a disc judging unit 11. The disc judging unit 11 performs disc judgment based on an output of the tracking error signal amplitude detecting circuit 8, an output of the peak number counting circuit 9 and the output of the signal amplification circuit 5. Servo control is carried out at a servo control unit 12. The servo control unit 12 controls the actuator mounted on the optical head 3 and the spindle motor 2 through a driver 13 based on the tracking error signal from the tracking error detecting circuit 7 and the focus error signal and mirror detection signal from the signal amplification circuit 5. The servo control unit 12 is capable of switching servo gain settings and the like based on disc type information from the disc judging unit 11. The driver 13 provides current for the actuator mounted on the optical head 3 and the spindle motor 2 based on information from the servo control unit 12.

Figure 4:
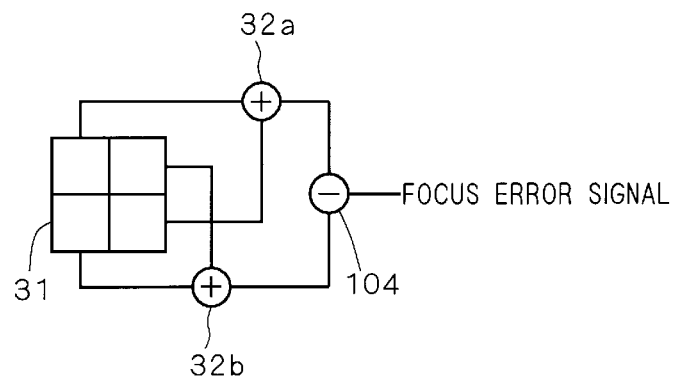

FIGS. 3 and 4 are detail block diagrams showing signal generation at the signal amplification circuit 5 shown in FIG. 2. The photodetector 4 mounted on the optical head 3 shown in FIG. 2 is indicated as a four-way split photodetector 31 in FIGS. 3 and 4. The mirror detection signal is generated through adder circuits 32*a*, 32*b*, an adder circuit 101, an envelope detection circuit 102 and a comparator 103. The focus error signal is generated through the adder circuits 32*a*, 32*b* and a subtracting circuit 104.

Figure 5:
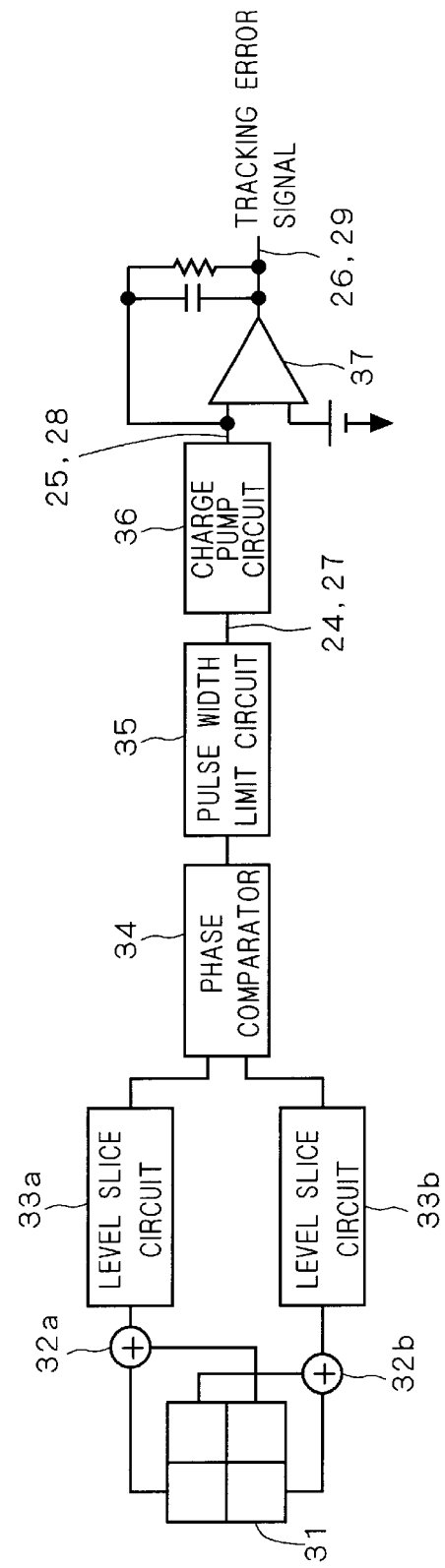
FIG. 5 is a detail block diagram showing a tracking error detecting circuit 7 shown in FIG. 2.

FIG. 5 is a detail block diagram showing the tracking error detecting circuit 7 shown in FIG. 2. The photodetector 4 mounted on the optical head 3 in FIG. 2 is indicated as the four-way split photodetector 31 in FIG. 5. The adder circuits 32*a* and 32*b* are provided in the signal amplification circuit 5 shown in FIG. 2. The tracking error detecting circuit 7 shown in FIG. 2 comprises: level slice circuits 33*a* and 33*b* for binarizing a signal from a pit on the optical disc 1; a phase comparator 34 for obtaining a phase error signal; a pulse width limit circuit 35 for preventing a pulse having a width equal to or greater than a predetermined pulse width (i.e., corresponding to a pulse width limit value set arbitrarily and variably for the circuit 35) from appearing in a pulse train of the phase error signal; a charge pump circuit 36 for converting the pulse width of the pulse train of the phase error signal to signal amplitude; and a filter circuit 37 for smoothing an output of the charge pump circuit 36.

Figure 6:
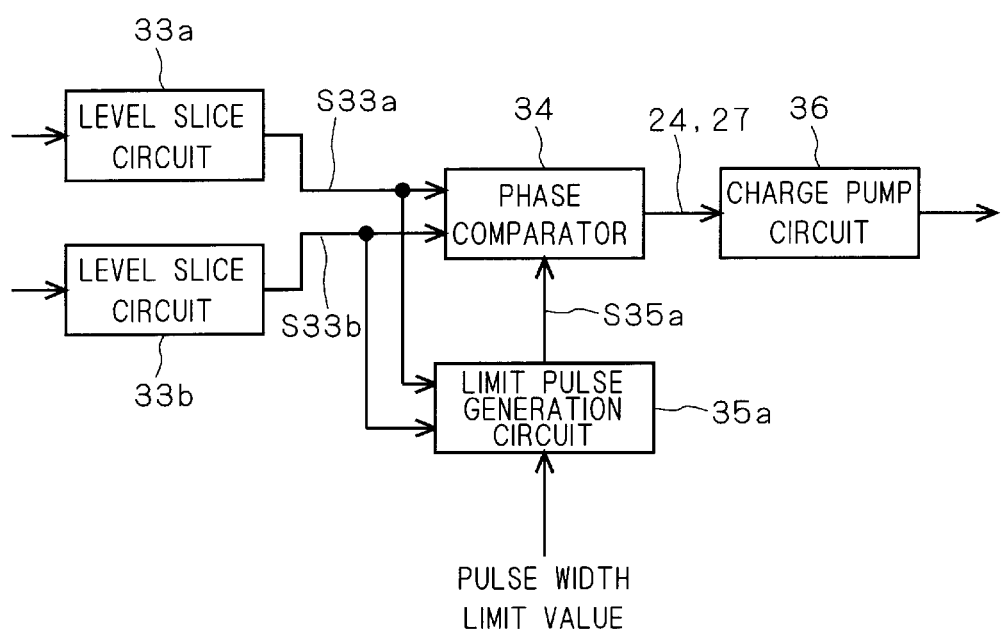
FIG. 6 is a block diagram exemplifying a pulse width limit circuit 35.

FIG. 6 is a block diagram exemplifying the pulse width limit circuit 35. As illustrated, the pulse width limit circuit 35 comprises a limit pulse generation circuit 35*a* for preventing the phase comparator 34 from generating a pulse of the phase error signal having a width greater than a predetermined pulse width. FIG. 7 is a timing chart showing the operation of the limit pulse generation circuit 35*a* shown in FIG. 6.

FIG. 8 is a detail block diagram showing the tracking error signal amplitude detecting circuit 8 shown in FIG. 2, comprising a switching circuit 42 for switching the tracking error signal by the mirror detection signal, a low-pass filter 43 for eliminating noise at an output of the switching circuit 42 and a peak/bottom holding circuit 44 for holding peak and bottom values of an output signal of the low-pass filter 43.

FIG. 9 is a detail block diagram showing the peak number counting circuit 9 shown in FIG. 2, comprising a level slice circuit 105 for slicing the focus error signal at a reference level for binarization.

Figure 10:
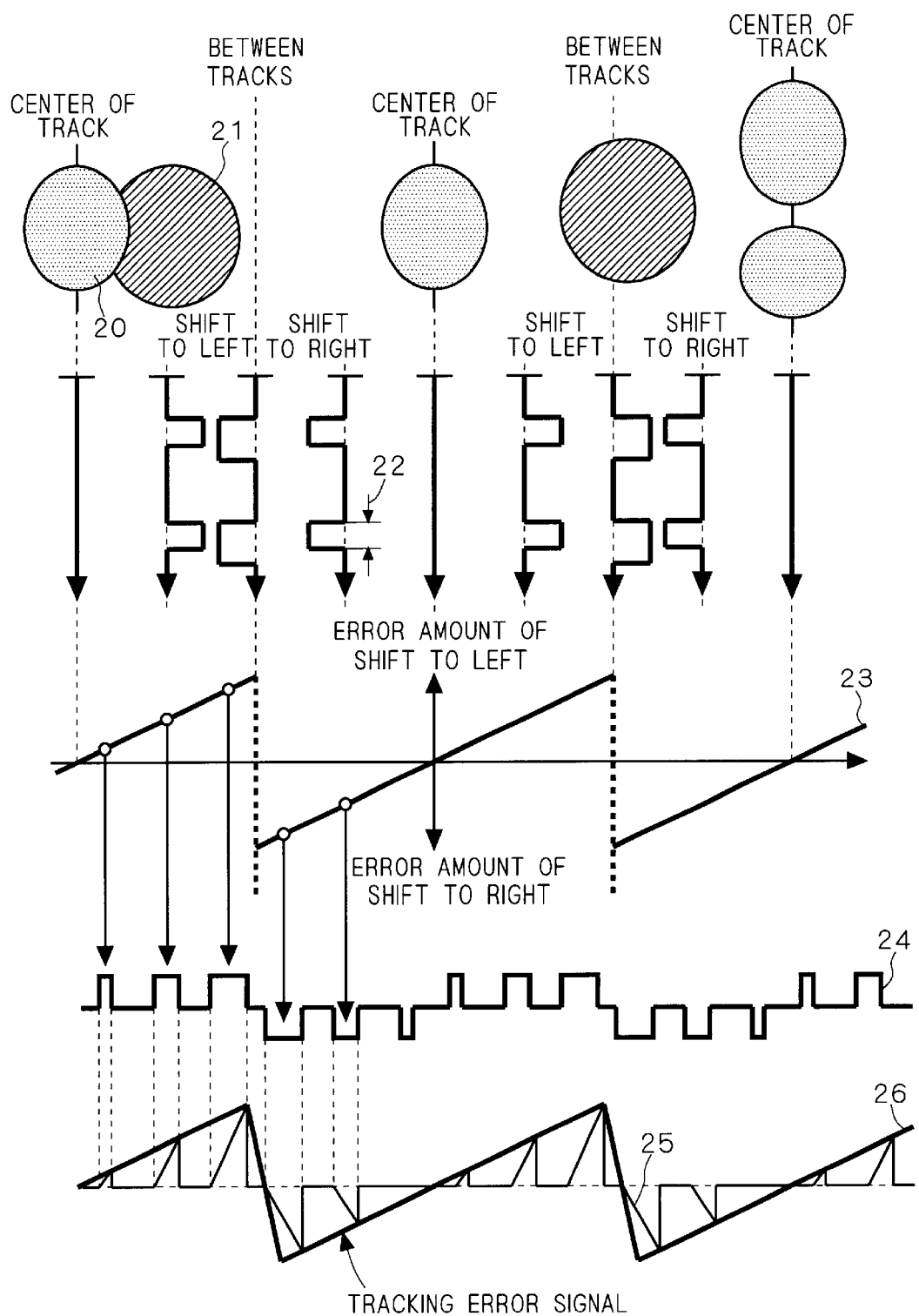
FIGS. 10 and 11 show the principle of generating a tracking error signal in the tracking error detecting circuit 7 using the phase difference (DPD) method.
Figure 11:
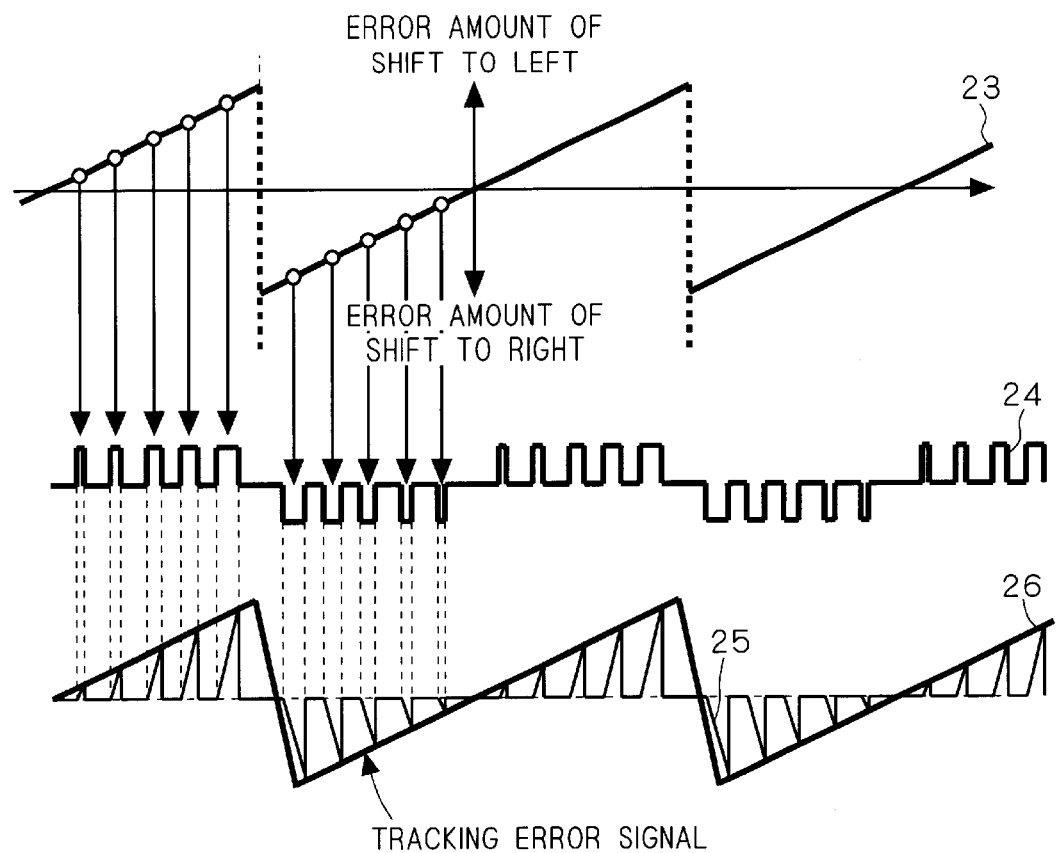

FIGS. 10 and 11 show the principle of generating a tracking error signal in the tracking error detecting circuit 7 using the phase difference (DPD) method. There are shown: a pit 20 on the optical disc 1; a light spot 21 irradiated from the optical head 3 and formed on the disc 1; the amount 22 of phase in a phase error signal; the amount 23 of error logically generated with respect to the amount of comparative phase shift between the pit 20 on the disc 1 and the light spot 21 in a direction perpendicular to a track; a phase error signal 24 obtained from reflected light of the pit 20 on the actual optical disc 1; a charge signal 25 generated from the phase error signal 24 by the charge pump circuit 36; and a tracking error signal 26 obtained as a result of detection of the charge signal 25. FIG. 10 shows the case of a CD disc and FIG. 11 shows the case of a DVD disc.

Figure 12:
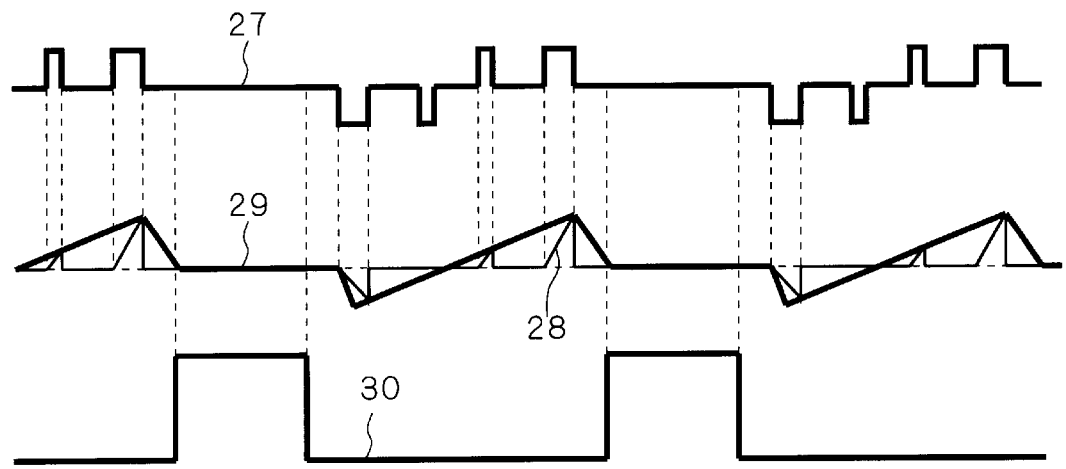
FIG. 12 shows the case that limitations are placed by the pulse width limit circuit 35 in generating the tracking error signal at the tracking error signal generating circuit 7 using the phase difference (DPD) method.

FIG. 12 shows the case that limitations are put by the pulse width limit circuit 35 in generating the tracking error signal in the tracking error detecting circuit 7 using the phase difference (DPD) method. There are shown a phase error signal 27 after the pulse width limitation, a charge signal 28 after the pulse width limitation, a tracking error signal 29 after the pulse width limitation and a mirror detection signal 30 to be used as a detection timing signal of the amplitude of the tracking error signal.

Figure 13:
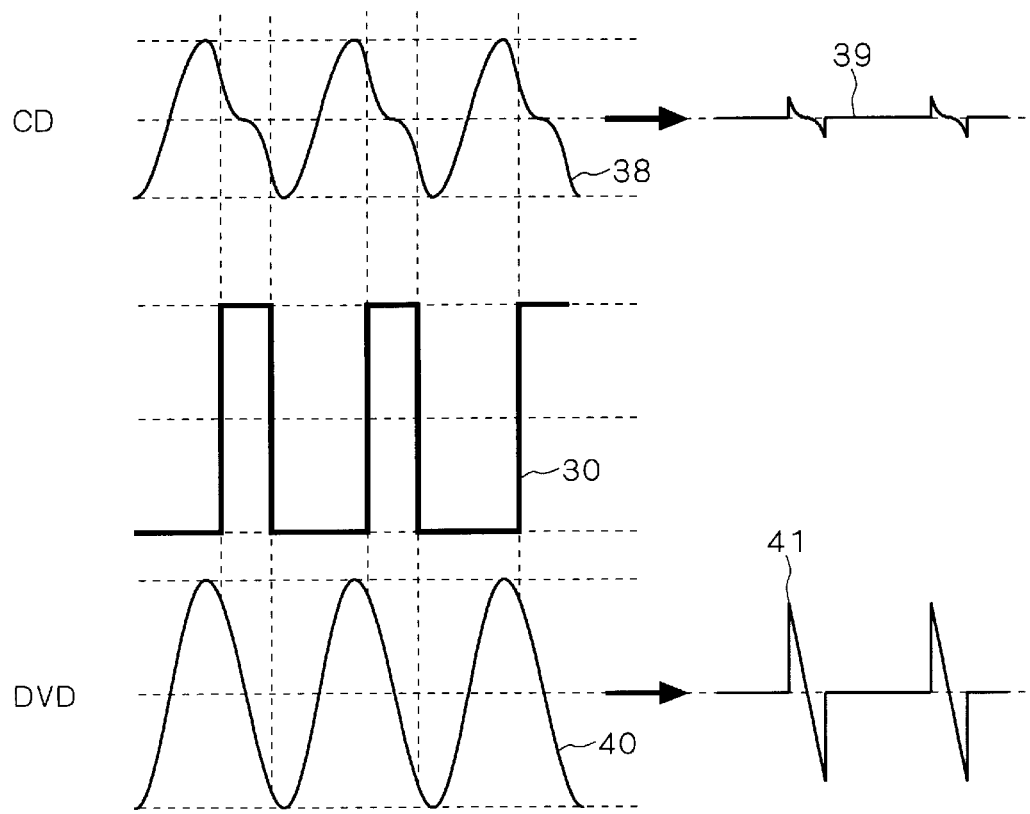
FIG. 13 shows actually measured waveforms in the case that the amplitude of the tracking error signal is measured only during the time period over which a mirror detection signal 30 is positioned between tracks.

FIG. 13 shows actually measured waveforms in the case that the amplitude of the tracking error signal is measured only during the time period over when the mirror detection signal 30 indicates between tracks. Shown are an actually measured tracking error signal 38 in a CD disc after the pulse width limitation, a signal 39 obtained by extracting the tracking error signal 38 in the CD disc by the mirror detection signal 30, an actually measured tracking error signal 40 in a DVD disc after the pulse width limitation and a signal 41 obtained by extracting the tracking error signal 40 in the DVD disc by the mirror detection signal 30. In the present embodiment, a pulse width limit value is set in such a manner that pulse width limitation should not work in a DVD disc. Therefore, the signal 40 is equal to the tracking error signal in a DVD disc before the pulse width limitation.

Figure 14:
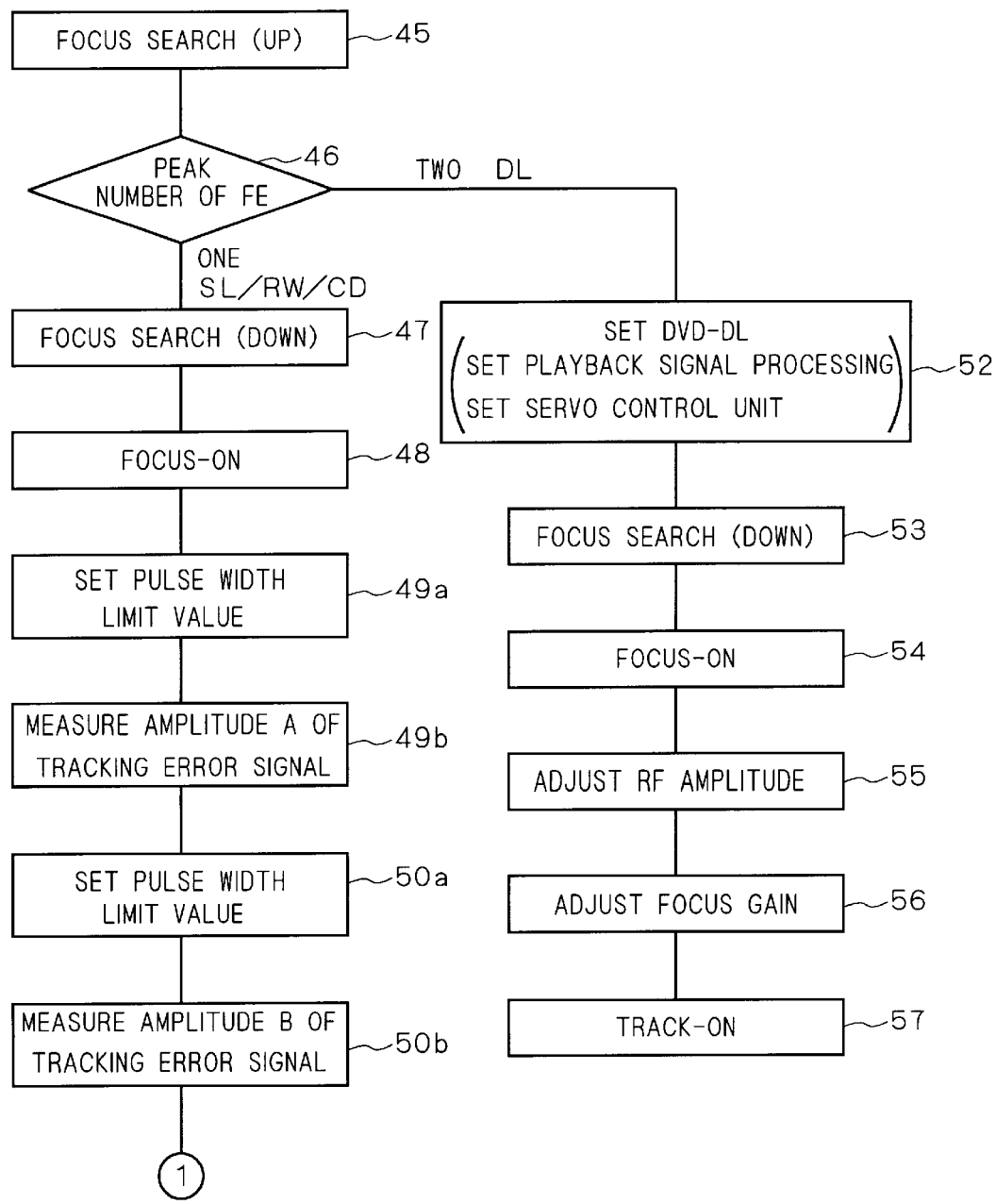
FIGS. 14 and 15 are flow charts indicating procedures from the start to the end of disc judgment.
Figure 15:
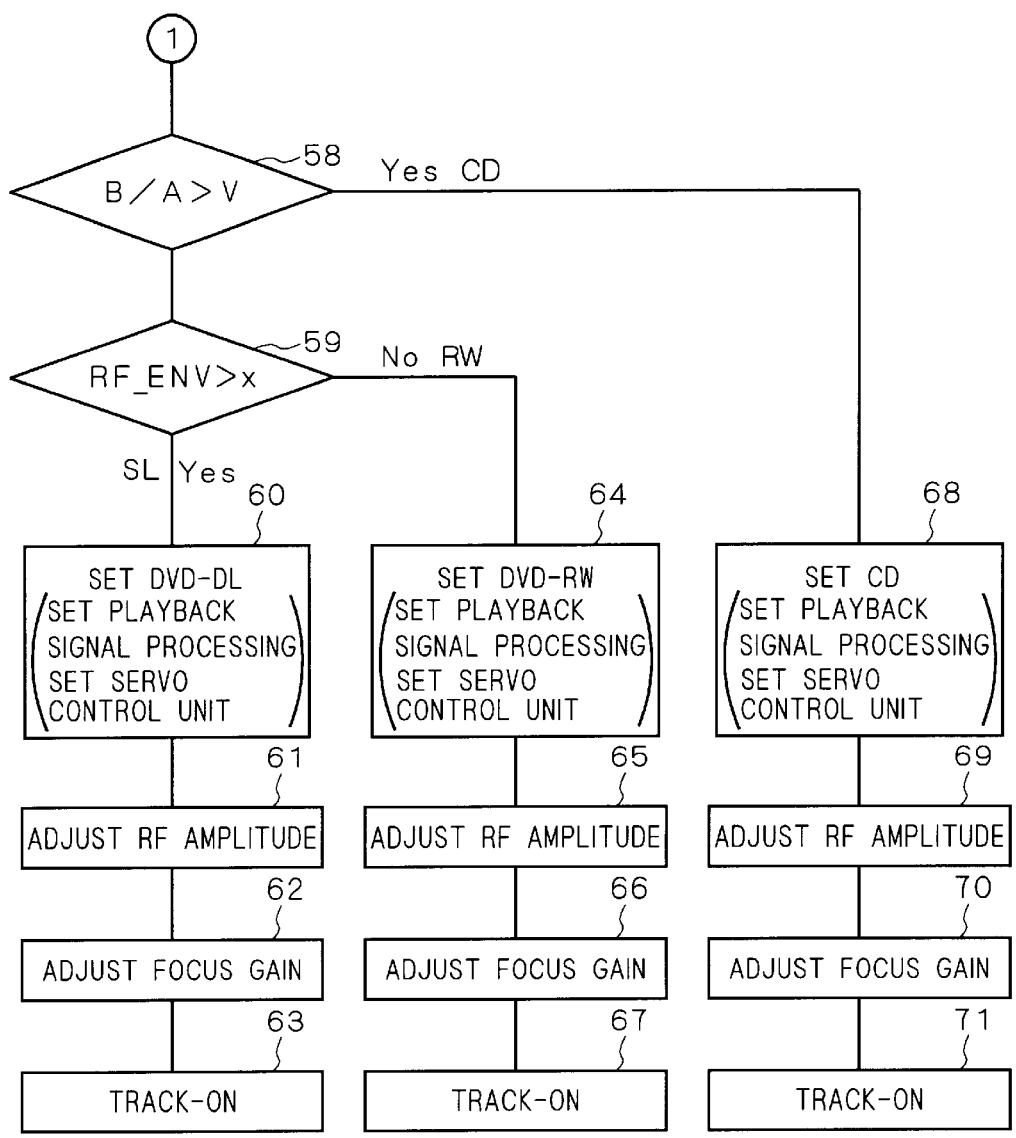
Figure 17:
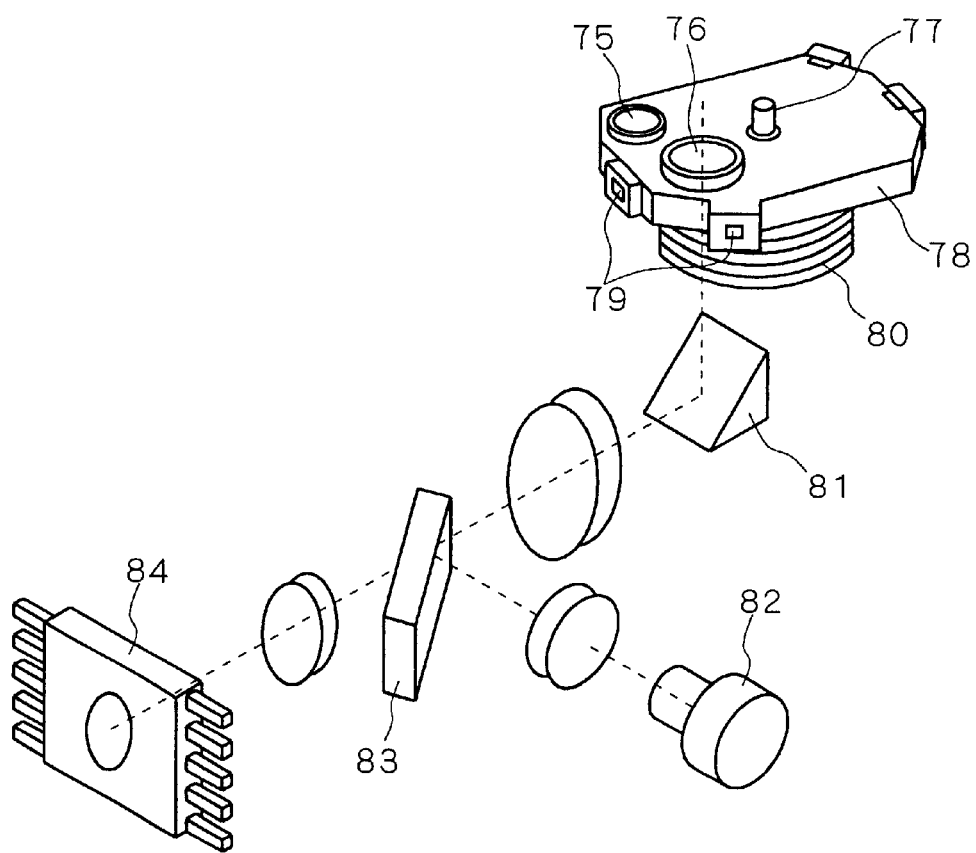
FIG. 17 shows a structure of a twin lens optical pickup having two lenses of different numerical apertures.
Figure 18:
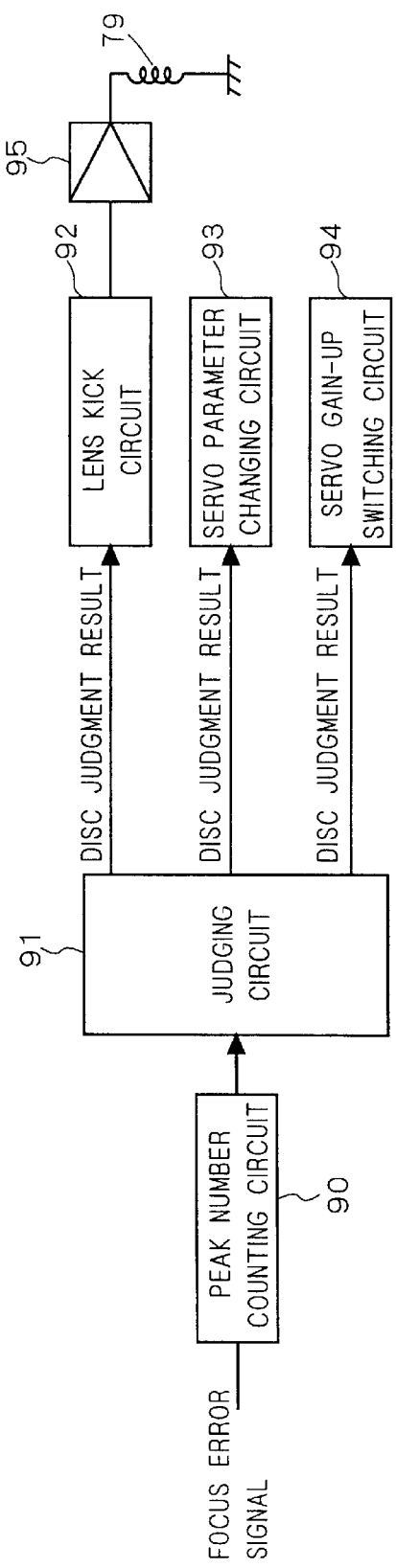
FIG. 18 shows a structure of a disc judging circuit in a conventional optical playback apparatus.
Figure 19:
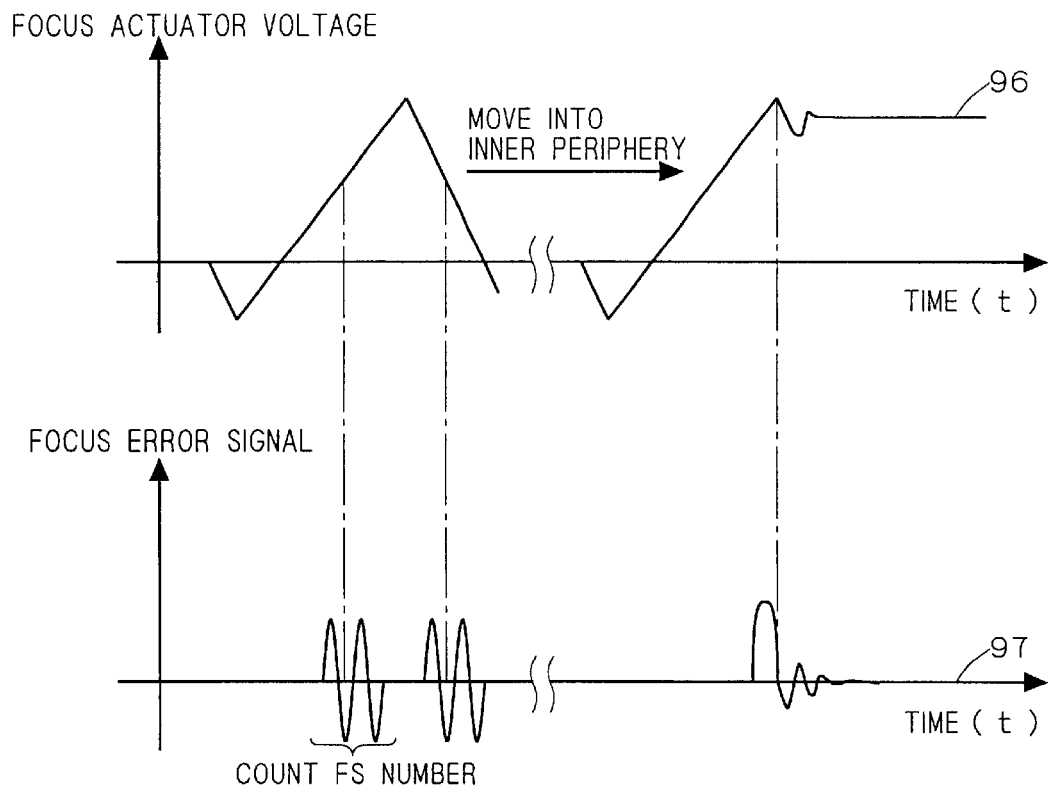
FIG. 19 shows waveforms indicating measuring procedure at disc judgment and focus-on operation using a double-layer DVD.
Figure 20:
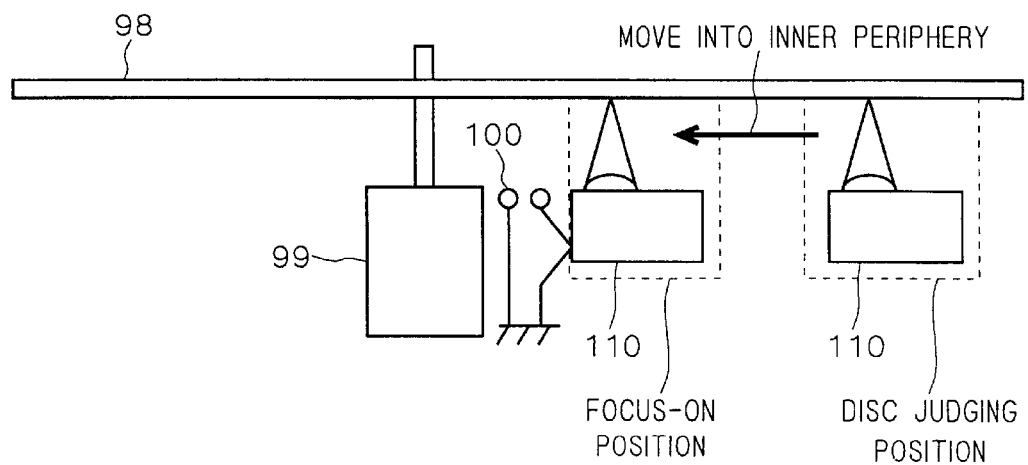
FIG. 20 shows where and how an optical head is positioned when disc judgment and focus-on operation are performed as shown in FIG. 19.

FIGS. 14 and 15 are flow charts indicating procedures from the start to the end of the disc judgment. Referring to FIG. 14, in step 45, focus search operation is performed for searching by the focus actuator mounted on the optical head 3 in a direction that the focus rises up (i.e., a direction that approaches the disc). In step 46, the number of peaks in focus error signals 16 to 19 is counted. In step 47, focus search operation is performed for searching by the focus actuator mounted on the optical head 3 in a direction that the focus falls down (i.e., a direction that moves away from the disc). In step 48, a focus control loop is turned on at the servo control unit 12. In steps 49a and 50a, a pulse width limit value is set at the tracking error detecting circuit 7. In steps 49b and 50b, the amplitude of the tracking error signal is measured. In step 52, settings are provided for a double-layer DVD at the playback signal processing circuit 6 and the servo control unit 12. In step 53, focus search operation is performed for searching by the focus actuator mounted on the optical head 3 in a direction that the focus falls down (i.e., a direction that moves away from the disc). In step 54, the focus control loop at the servo control unit 12 is turned on. In step 55, the amplitude of an RF signal is adjusted at the signal amplification circuit 5. In step 56, a servo gain of the focus control loop is adjusted at the servo control unit 12. In step 57, a track control loop at the servo control unit 12 is turned on.

Referring to FIG. 15, in step 58, the ratio between values of the amplitude of the tracking error signal measured twice in the steps 49b and 50b is calculated. In step 59, the magnitude of the amplitude of the RF signal is judged. In step 60, settings are provided for a single-layer DVD at the playback signal processing circuit 6 and the servo control unit 12. In step 64, settings are provided for a recordable DVD at the playback signal processing circuit 6 and the servo control unit 12. In step 68, settings are provided for a CD at the playback signal processing circuit 6 and the servo control unit 12. In steps 61, 65 and 69, the amplitude of the RF signal is adjusted at the signal amplification circuit 5. In steps 62, 66 and 70, the servo gain of the focus control loop is adjusted at the servo control unit 12. In steps 63, 67 and 71, the track control loop at the servo control unit 12 is turned on.

Referring now to a conventional and general playback apparatus for a DVD disc, since a DVD disc has a track pitch different from that of a CD disc, resulting in incapability of employing a triple-beam method which have been conventionally employed in a CD player for detecting a tracking error, the phase difference method is employed which generates a tracking error signal based on phase difference information in pit information of a playback signal. In this phase difference method, a tracking error signal is generated on a principle as shown in FIGS. 10 and 11.

In FIG. 10, the amount 22 of phase (the amount of phase difference of binarized playback information from the pit) of a phase error signal 24 in the phase difference method using a four-way split photodetector becomes zero when the light spot 21 is on the track with respect to the recording pit 20. When the light spot 21 is shifted to a direction perpendicular to the track with respect to the recording pit 20, the amount 22 is detected as an amount of phase having a polarity according to the shift direction. The detected amount 22 of phase of the phase error signal 24 increases in accordance with the amount 23 of a tracking error (the light spot 21 crosses the track three times in FIGS. 10 and 11) and becomes discrete pulse width information per pit. Therefore, using the charge pump circuit, for example, pulse width information in the phase error signal 24 is converted into voltage information, as indicated by the charge signal 25. It is further converted into the continuous tracking error signal 26 by means of the filter circuit and the like so as to be a signal for controlling the actuator.

In the present invention, the disc type judgment is performed based on the amplitude of the tracking error signal. The phase difference method inherently enables to generate an error signal regardless of a difference in track pitch. Thus, in a conventional phase difference method, there is no difference in the amplitude of the tracking error signal 26 comparing the case of a CD disc (FIG. 10) and that of a DVD disc (FIG. 11).

However, each pulse in the pulse train of the phase error signal 24 is discrete information which is obtained only as the unit of the pit 20. Therefore, the detected amount 22 of phase (i.e., each pulse width) considerably varies depending on a pit recording density of the optical disc and a relative velocity between the pit 20 and the light spot 21 based on the pit recording density. In the case of a CD, the pit density is low and necessary playback signal rate is low so that a relative linear velocity is low, resulting in a low playback signal frequency. The opposite applies to the case of a DVD. Consequently, as apparent from comparison between FIGS. 10 and 11, each amount 22 of phase (each pulse width) of the pulse train of the phase error signal 24 in a CD (FIG. 10) is greater than that in a DVD (FIG. 11) with respect to the same tracking shift 23.

The present invention takes notes of the above points. Its technical idea is to judge disc type based on the difference in the amount 22 of phase (pulse width) of the pulse train of the phase error signal 24.

More specifically, in the present embodiment, in order that a correct judgement result can be obtained against noise, variations in the operation and the like, pulse width limitation is performed for preventing a pulse of a width equal to or larger than a predetermined one from appearing in the pulse train of the phase error signal 24. That is, a pulse width limit value is set in such a manner that the pulse width limitation does not work for the phase error signal 24 at DVD playback and that it works for the phase error signal 24 at CD playback. Then, as shown in FIG. 12, a tracking error signal 29 after the pulse width limitation is generated based on the phase error signal 27 after the pulse width limitation, allowing to obtain tracking error signals 26 and 29 which are greatly different in the amplitude in a CD (FIG. 10) and in a DVD (FIG. 11).

In the present invention, the tracking error detecting circuit 7 is constructed of a circuit block as shown in FIG.

5 in order to realize the above concept. In FIG. 5, outputs of the four-way split detector are added at the adder circuits 32a and 32b in such a combination that information on the phase difference should be obtained, and then, binarized at the level slice circuits 33a and 33b. Thereafter, the phase difference is detected at the phase comparator 34 to generate a phase error signal. As has been conventionally known, the phase error signal is converted into voltage at the charge pump circuit 36 and filtered at the filter circuit 37, thereby obtaining a tracking error signal by the phase difference method. In the present invention, the pulse width limit circuit 35 is operated on the phase error signal, so that only a pulse having a large amount of phase (large pulse width) in the pulse train of the phase error signal is deleted. Thereby, the pulse width limitation is carried out only in a CD, allowing generation of the tracking error signal 29 shown in FIG. 12.

For instance, the function of the pulse width limit circuit 35 shown in FIG. 5 can be attained by the limit pulse generation circuit 35a shown in FIG. 6. Referring to the timing chart shown in FIG. 7, output signals S33a and S33b from the level slice circuits 33a and 33b are inputted into the limit pulse generation circuit 35a. The limit pulse generation circuit makes its output signal (limit signal) S35a high at the earlier timing of rising up between phases of the signals S33a and S33b. The signal S35a may be made high not only at the earlier timing of rising up, but also at the earlier timing of falling down. The limit pulse generation circuit 35a internally includes a one-shot multivibrator (not shown) for setting the pulse width of the limit signal S35a. The pulse width is determined by changing a time constant of the one-shot multi-vibrator to an arbitrary value with the pulse width limit value from the outside. That is, the one-shot multi-vibrator is triggered at the timing that the limit signal S35a turns high, and inverts the limit signal S35a to low after a lapse of time determined by the pulse width limit value. After the limit signal S35a is given, the phase comparator 34 has its output signal outputted in the case that one of the signals S33a and S33b is inverted in condition and the other of the signals S33a and S33b is inverted in the same direction during the limit signal S35a is in the high state. Accordingly, the phase error signal 24 in which all pulses appear in its pulse train and the phase error signal 27 in which a pulse of a width equal to or larger than a certain pulse width does not appear in its pulse train can selectively be obtained in accordance with the pulse width limit value from the outside.

Inherently, the pulse width limit circuit, at normal playback, does not operate with the amount of phase to be essentially generated, but operates for suppressing occurrence of an abnormally high voltage only when it is caused by noise or the like. At the disc judgment in the optical disc playback apparatus of the present invention, however, it has been devised that the pulse width limit value is set in such a manner that it does not work in a DVD but works in a CD. This allows the pulse width limit circuit to be used for judging disc type by the amplitude of a tracking error signal.

Referring back to FIGS. 10 to 12, an area that the amount 22 of phase increases lies in between one information track and another one (between tracks). To detect this, envelope detection is carried out for the playback RF signal obtained from the total sum of the four-way split detector 31 at the envelope detection circuit 102 as shown in FIG. 3, and the detected signal is compared with a reference voltage at the comparator 103, thereby generating the mirror detection signal 30. The mirror detection signal 30 can be used for judging whether the light spot 21 is on a track or between tracks. Therefore, detection of the amplitude of the tracking error signal at the timing of the mirror detection signal 30 achieves more reliable operation of the pulse width limit circuit in the case that the detected amount of phase is large as in CD playback. That is, it is possible to obtain a larger difference in amplitude information on a tracking error signal between a CD and a DVD, enabling to prevent a misjudgment. In particular, the amplitude of the tracking error signal based on the phase error signal varies depending on variations in the number of rotation of the disc and variations in depth of a pit on the disc, which arises the necessity of devising reliable disc type judgment regardless of the above-noted variations. The tracking error signal actually extracted by the mirror detection signal 30 has an extremely small amplitude in the case of a CD as indicated by the signal 39 in FIG. 13, while it has a large amplitude in the case of a DVD as indicated by the signal 41 in FIG. 13, which is very convenient.

Here, the need arises to detect the magnitude of the amplitude in an actual judgment, which is carried out in the circuit shown in the block diagram of FIG. 8. A tracking error signal 38 or 40 is selectively switched to zero by the switching circuit 42 at the timing of the mirror detection signal 30. As a result, an output of the switching circuit 42 is outputted as the signal 39 or the signal 41 shown in FIG. 13. This is caused to pass through the low-pass filter 43 for eliminating noise and its peak and bottom values are stored at the peak/bottom holding circuit 44. A difference between the peak and bottom values is calculated at the disc judging unit 11, thereby obtaining the amplitude information.

Such a detection of the amount of the tracking error signal amplitude is generally performed in a procedure according to a sequence control by a microcomputer, and judgment is carried out at the microcomputer. FIGS. 14 and 15 show the operating flow charts.

First, the focus actuator mounted on the optical head 3 starts to search so that an objective lens (bifocal lens) approaches the disc (step 45). If the focus servo loop is not turned on at this time, S curve, which is the focus error signal, appears as shown in FIG. 1 at a timing that achieves focus on the disc 1 during the search. This is realized by the structure shown in FIG. 4 included in the signal amplitude circuit 5. It is sliced at the reference level indicated by broken lines in FIG. 1 at the peak number counting circuit 9 by the level slice circuit 105 shown in FIG. 9 for binarization. The number of peaks of S curve is counted at the disc judging unit 11, enabling to judge whether it is a double-layer disc or another type of disc (step 46). When it is judged as a double-layer disc, settings on ECC, in particular, in the playback signal processing circuit 6 are switched to a DVD, and in addition, an address management portion is set to a double-layer disc. The servo control unit 12 is also set to the double-layer disc so that focus jump operation is achievable and a focus lock detecting signal is able to operate normally on a disc having a low reflectance (step 52). Further, the focus search direction is switched to a direction away from the disc (step 53), and focus-on operation is performed in a predetermined layer of the double-layer disc by the servo control unit 12 (step 54). The RF amplitude is adjusted (step 55) and a focus gain is adjusted (step 56), which are followed by track-on operation (step 57).

Next, when the counting of the number of peaks shows that it is a disc other than a double-layer disc, that is, when it is judged that S curve appears only once, the search direction is switched for a time to a direction away from the disc (step 47), and focus-on operation is carried out at a focal point (step 48). At this time, if an AGC circuit is provided based on disc reflectance (a sum signal, actually) at a portion of the signal amplitude circuit 5 where the focus error signal is generated, the focus-on operation becomes possible without any problem regardless of the disc reflectance. Thereafter, limit setting is provide for the pulse width limit circuit 35 so that the pulse width limitation works only for a CD (that is, a pulse width limit value is set in such a manner that a pulse of a width equal to or larger than a predetermined width should not appear in the pulse train of the phase error signal intended for a CD and that there appear all pulses of the pulse train of the phase error signal intended for a DVD) (step 49a), and the amplitude of the tracking error signal is measured at the tracking error signal amplitude detecting circuit 8 (step 49b). An amplitude value measured at this time is denoted by A. Next, upon setting the pulse width limit circuit 35 in such a manner that limitation should not work either for a CD or a DVD (that is, the pulse width limit value is set in such a manner that all pulses should appear in both of the pulse train of the phase error signal intended for a CD and that of the phase error signal intended for a DVD) (step 50a), or upon setting the pulse width limit circuit 35 not to operate (for instance, causing the signal to pass through as it is), the amplitude of the tracking error signal is measured at the tracking error signal amplitude detecting circuit 8 (step 50b). An amplitude value measured at this time is denoted by B.

Referring now to the flow chart shown in FIG. 15, the ratio of the above-noted values A and B is calculated. When the ratio exceeds a reference value V, it is judged as a CD (step 58). Since a DVD disc has much higher recording density and higher signal rate than a CD disc, the pulse width limitation does not work for the pulse train of the phase error signal to be detected, resulting in that the values A and B become substantially the same. As a result, $$B/A=1$$

holds. On the other hand, in the case of a CD, the pulse width limitation works only at measuring the amplitude of the tracking error signal in the step 49b, so that $$A<B$$

holds. As a result, the value B/A becomes great.

In the method as described above for conducting measurement especially on the amplitude ratio in which the pulse width limit value is varied, even when there are variations in depth of the pit on the disc 1, which may result in a decrease or an abnormal increase in the amplitude of the tracking error signal, the measurement on the ratio allows to compensate the influence due to the variations in depth of the pit, achieving the effect of preventing a misjudgment. Further, even when the number of rotation of the disc and the linear density vary, so that the tracking error signal amplitude also varies, there is no influence due to the variations in the number of rotation of the disc and the linear density as the measurement is conducted on the ratio as described above. Therefore, the instant method is also applicable to an optical disc apparatus in a CAV mode which operates with a constant number of rotations, and besides, it is capable of eliminating an influence due to the variations in the number of rotations also at disc judgment when a motor is started to activate at a fixed voltage in an apparatus which does not use an FG for a spindle motor.

Instead of taking the ratio between the values A and B in the step 58, A and B may be directly compared. That is, A and B may be compared to make judgment depending on whether a difference between A and B is larger than a predetermined value or not, which produces the same effect as above described.

Moreover, the steps 50a and 50b may be omitted. In that case, the value A itself may be compared with a predetermined reference value, thereby judging whether it is a CD disc or not.

Next, when it is judged as neither a double-layer disc nor a CD disc, distinguishment is necessary as to whether it is a DVD single-layer disc or a recordable DVD disc. A recordable DVD disc represented by DVD-RW and DVD-RAM has the same specs on reflectance as a DVD double-layer disc, which can be distinguished by judging the magnitude of the RF playback signal level (the output of the envelope detection circuit 102 shown in FIG. 3). This is carried out at the disc judging circuit 11 (step 59). After settings are provided for each of the CD disc, the DVD single-layer disc and the recordable DVD disc distinguished as above described at the playback signal processing circuit 6 and the servo control unit 12 (steps 60, 64 and 68), the RF signal amplification rate is varied in order to obtain a data error and a tracking error signal normally at the signal amplifier 5 in accordance with the detected RF signal level (steps 61, 65 and 69), resulting in a predetermined signal amplitude. In addition, after the focus gain is adjusted (steps 62, 66 and 70), the track-on operation is provided (steps 63, 67 and 71). After the track-on operation, it is needless to say that an essential information playback operation is started upon acknowledgment of address detection and the disc type again based on data described on the disc by read-in information.

While the invention has been shown and described in detail, the foregoing description is in all aspects illustrative and not restrictive. It is therefore understood that numerous modifications and variations can be devised without departing from the scope of the invention.

What is claimed is:

1. An optical disc playback apparatus comprising:
   an optical head for reading information recorded on an optical disc, comprising a photodetector divided into plural parts receiving reflected light from said optical disc;
   signal generating means for binarizing an output signal of said photodetector to detect phase difference, thereby generating a pulse train signal having a variable pulse width in accordance with a tracking error as well as recording density of said optical disc; and
   judging means for performing disc type judgment of said optical disc based on said pulse train signal.

2. The optical disc playback apparatus according to claim 1, wherein
   said optical head comprises a bifocal lens.

3. The optical disc playback apparatus according to claim 1, further comprising
   a pulse width limit circuit for preventing occurrence of a pulse having a width larger than a predetermined width in said pulse train signal, wherein
   said judging means performs said disc type judgment based on said pulse train signal after pulse width limitation.

4. The optical disc playback apparatus according to claim 3, wherein
   said pulse width limit circuit is capable of selectively setting a first predetermined width or a second predetermined width as said predetermined width, and
   said judging means performs said disc type judgment based on said pulse train signal after pulse width limitation with said first predetermined width and said pulse train signal after pulse width limitation with said second predetermined width.

5. The optical disc playback apparatus according to claim 3, further comprising:
   means for generating a mirror detection signal from an output signal of said optical head; and
   means for making said pulse train signal effective for said disc type judgment by said judging means only for a period of time responsive to said mirror detection signal.

6. The optical disc playback apparatus according to claim 1, further comprising
   a pulse width limit circuit for preventing occurrence of a pulse having a width larger than a predetermined width in said pulse train signal, wherein
   said judging means performs said disc type judgment based on said pulse train signal before pulse width limitation and said pulse train signal after pulse width limitation.

7. The optical disc playback apparatus according to claim 1, further comprising
   means for generating a focus error signal from an output signal of said optical head, wherein
   said judging means performs said disc type judgment based on said focus error signal as well as said pulse train signal.

8. The optical disc playback apparatus according to claim 1, further comprising
   means for generating a playback signal from an output signal of said optical head and detecting the amplitude thereof, wherein
   said judging means performs said disc type judgment based on said detected amplitude as well as said pulse train signal.

9. The apparatus according to claim 1, wherein said judging means performs said disc type judgment based on a magnitude of said pulse width of said pulse train signal.

10. The apparatus according to claim 9, wherein said signal generating means includes a charge pump circuit 36 for converting said pulse width of said pulse train signal to a signal amplitude to obtain said pulse width magnitude.

11. A method of judging disc type in an optical disc playback apparatus, comprising the steps of:
    reading information recorded on an optical disc using an optical head comprising a photodetector divided into plural parts receiving reflected light from said optical disc;
    binarizing an output signal of said photodetector to detect phase difference, thereby generating a pulse train signal having a variable pulse width in accordance with a tracking error and a recording density of said optical disc; and
    judging disc type of said optical disc based on said pulse train signal.

12. The method of judging disc type in an optical disc playback apparatus according to claim 11, wherein
    said optical head comprises a bifocal lens.

13. The method of judging disc type in an optical disc playback apparatus according to claim 11, further comprising the step of
    preventing occurrence of a pulse having a width larger than a predetermined width in said pulse train signal, wherein
    said disc type judgment is performed based on said pulse train signal after pulse width limitation.

14. The method of judging disc type in an optical disc playback apparatus according to claim 13, wherein
    a first predetermined width or a second predetermined width can selectively be set as said predetermined width, and
    said disc type judgment is performed based on said pulse train signal after pulse width limitation with said first predetermined width and said pulse train signal after pulse width limitation with said second predetermined width.

15. The method of judging disc type in an optical disc playback apparatus according to claim 13, further comprising the steps of:
    generating a mirror detection signal from an output signal of said optical head; and
    making said pulse train signal effective for said disc type judgment in said step of judging only for a period of time responsive to said mirror detection signal.

16. The method of judging disc type in an optical disc playback apparatus according to claim 11, further comprising the step of
    preventing occurrence of a pulse having a width larger than a predetermined width in said pulse train signal, wherein
    said disc type judgment is performed by means of comparison or ratio between information obtained from said pulse train signal before pulse width limitation and that obtained from said pulse train signal after pulse width limitation.

17. The method of judging disc type in an optical disc playback apparatus according to claim 11, further comprising the step of
    generating a focus error signal from an output signal of said optical head, wherein
    said disc type judgment is performed based on said focus error signal as well as said pulse train signal.

18. The method of judging disc type in an optical disc playback apparatus according to claim 11, further comprising the step of
    generating a playback signal from an output signal of said optical head and detecting the amplitude thereof, wherein
    said disc type judgment is performed based on said detected amplitude as well as said pulse train signal.

19. The method according to claim 11, wherein
    said binarizing step includes converting said pulse width of said pulse train signal to a signal amplitude, and
    said judging step judges said disc type based on said signal amplitude.

20. A device for determining a type of optical disc in an optical disc playback device, comprising:
    phase difference detecting means for generating a pulse train signal from an output signal from a photodetector that receives reflected light from an optical disc, wherein said pulse train signal has a variable pulse width that is indicative of a phase difference of said output signal; and
    judging means for performing disc type judgment of said optical disc based on a magnitude of said pulse width.

21. A method of judging a type of optical disc in a optical disc playback device, comprising:
    generating a pulse train signal from an output signal from a photodetector that receives reflected light from an optical disc, wherein said pulse train signal has a variable pulse width that is indicative of a phase difference of said output signal; and
    performing disc type judgment of said optical disc based on a magnitude of said pulse width.

* * * * *